(12) United States Patent
Yoneda

(10) Patent No.: US 11,368,666 B2
(45) Date of Patent: Jun. 21, 2022

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Keigo Yoneda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/133,770

(22) Filed: Dec. 24, 2020

(65) Prior Publication Data

US 2021/0120224 A1    Apr. 22, 2021

Related U.S. Application Data

(63) Continuation of application No. PCT/JP2019/016562, filed on Apr. 18, 2019.

(30) Foreign Application Priority Data

Jul. 12, 2018   (JP) .............................. JP2018-132639

(51) Int. Cl.
*H04N 13/282*     (2018.01)
*H04N 13/296*     (2018.01)
(Continued)

(52) U.S. Cl.
CPC ......... *H04N 13/282* (2018.05); *H04N 5/2224* (2013.01); *H04N 5/247* (2013.01); *H04N 5/783* (2013.01); *H04N 13/296* (2018.05)

(58) Field of Classification Search
CPC .. G11B 27/031; G11B 27/105; H04N 13/282; H04N 13/296; H04N 21/21805;
(Continued)

(56) References Cited

U.S. PATENT DOCUMENTS

2018/0121069 A1*  5/2018  DiVerdi .................. G06F 3/011
2018/0160049 A1   6/2018  Aizawa
(Continued)

FOREIGN PATENT DOCUMENTS

EP         2960864 A1     12/2015
JP       2012-109719 A     6/2012
(Continued)

OTHER PUBLICATIONS

International Search Report issued in International Application No. PCT/JP2019/016562 dated Jul. 9, 2019, pp. 1.
(Continued)

*Primary Examiner* — Thai Q Tran
*Assistant Examiner* — Stephen R Smith
(74) *Attorney, Agent, or Firm* — Carter, DeLuca & Farrell LLP

(57) ABSTRACT

A control is performed such that a speed of change of the virtual viewpoint which is changed in accordance with acceptance of an input according to a specific user operation during playback of the virtual viewpoint image at a first playback speed becomes lower than a speed of change of the virtual viewpoint which is changed in accordance with acceptance of an input according to the specific user operation during playback of the virtual viewpoint image at a second playback speed higher than the first playback speed.

16 Claims, 10 Drawing Sheets

(51) Int. Cl.
*H04N 5/222* (2006.01)
*H04N 5/247* (2006.01)
*H04N 5/783* (2006.01)

(58) Field of Classification Search
CPC ..... H04N 21/234381; H04N 21/47205; H04N 21/4728; H04N 21/816; H04N 21/854; H04N 5/2224; H04N 5/23293; H04N 5/247; H04N 5/2627; H04N 5/77; H04N 5/783; H04N 5/91; H04N 9/8205
USPC ................. 348/47, 159; 463/31; 345/419
See application file for complete search history.

(56) References Cited

U.S. PATENT DOCUMENTS

| | | | | |
|---|---|---|---|---|
| 2018/0295389 A1* | 10/2018 | Kaku | ................. | H04N 21/8146 |
| 2019/0166410 A1* | 5/2019 | Kirk | .......................... | G06T 7/50 |
| 2019/0221029 A1 | 7/2019 | Yoneda | | |
| 2019/0273837 A1* | 9/2019 | Townsend | ............ | H04N 1/2108 |
| 2019/0335161 A1* | 10/2019 | Court | ................... | H04N 13/282 |
| 2020/0059675 A1* | 2/2020 | Yoshikawa | ...... | H04N 21/21805 |
| 2020/0145635 A1 | 5/2020 | Yoneda | | |
| 2020/0154044 A1* | 5/2020 | Lasak | ................ | H04N 5/23238 |
| 2020/0349734 A1* | 11/2020 | Wu | .................... | H04N 5/23229 |
| 2020/0374567 A1* | 11/2020 | Tokumo | ............. | H04N 21/2353 |

FOREIGN PATENT DOCUMENTS

| | | |
|---|---|---|
| JP | 2018-46448 A | 3/2018 |
| JP | 2018-92491 A | 6/2018 |
| WO | 2018051688 A1 | 3/2018 |

OTHER PUBLICATIONS

Extended European Search Report issued by the European Patent Office dated Mar. 22, 2022 in corresponding EP Patent Application No. 19835094.4.

* cited by examiner

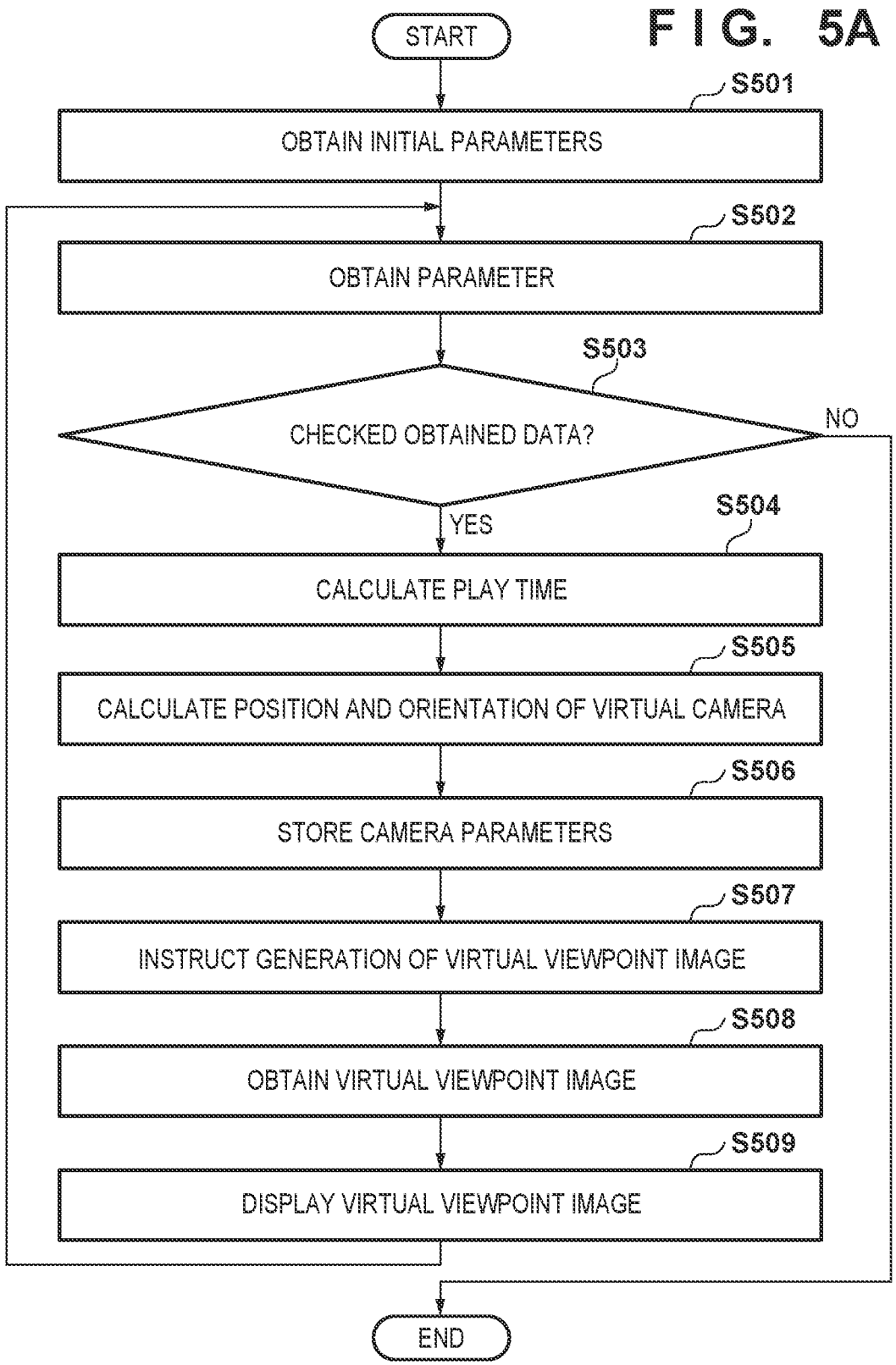

FIG. 7

| TIME | 01:02:03:00 |
|---|---|
| PLAYBACK MODE OF VIRTUAL VIEWPOINT IMAGE | CAMERA PATH CREATION MODE |
| PLAYBACK SPEED OF VIRTUAL VIEWPOINT IMAGE | 0.5 |
| MOVING SPEED OF VIRTUAL CAMERA | 0.5 |
| x POSITION OF VIRTUAL CAMERA | 100 |
| y POSITION OF VIRTUAL CAMERA | 200 |
| ⋮ | ⋮ |

INFORMATION PROCESSING APPARATUS, INFORMATION PROCESSING METHOD, AND STORAGE MEDIUM

CROSS-REFERENCE TO RELATED APPLICATIONS

This application is a Continuation of International Patent Application No. PCT/JP2019/016562, filed Apr. 18, 2019, which claims the benefit of Japanese Patent Application No. 2018-132639, filed Jul. 12, 2018, both of which are hereby incorporated by reference herein in their entirety.

BACKGROUND

Field

The present disclosure relates to an information processing apparatus, an information processing method, and a storage medium.

Background Art

In recent years, a technique of performing multi-viewpoint synchronous image capturing by installing a plurality of cameras in different positions and using a plurality of viewpoint images obtained by the image capturing operation to generate not only images from the camera installation positions but also a virtual viewpoint image formed from one or more arbitrary viewpoints is gaining attention.

A service using a virtual viewpoint image allows a video producer to produce an impactful viewpoint content from, for example, a video obtained by capturing a soccer game or a basketball game. In addition, it also allows a user who is the viewer of the content to watch the game by freely moving his/her viewpoint, and provides the user with a more true-to-life viewing experience compared to conventional captured images.

PTL 1 discloses a control method of a virtual camera for implementing a composition desired by the operator of the virtual camera. More specifically, an arrangement is disclosed in which, during playback of video content data including arbitrary viewpoint video data, if the user performs an operation to move the viewpoint of the arbitrary viewpoint video data, the viewpoint movement amount is controlled for each area in the arbitrary viewpoint video being played back.

CITATION LIST

Patent Literature

PTL 1: Japanese Patent Laid-Open No. 2012-109719

However, the technique described in PTL 1 has a problem that it is difficult to generate a virtual viewpoint image with a composition desired by the operator in accordance with movement of an object.

The present disclosure has been made in consideration of the above-described problem, and has as its object to provide a technique for facilitating generation of a virtual viewpoint image with a composition desired by the operator of the virtual viewpoint.

SUMMARY

According to one aspect of the present disclosure, there is provided an information processing apparatus comprising: a determination unit configured to determine a playback speed of a virtual viewpoint image based on a plurality of captured images; an acceptance unit configured to accept an input according to a user operation during playback of the virtual viewpoint image at the playback speed determined by the determination unit; and a control unit configured to perform control to change a virtual viewpoint corresponding to the virtual viewpoint image based on the input accepted by the acceptance unit, and performing control such that a speed of change of the virtual viewpoint which is changed in accordance with acceptance of an input according to a specific user operation during playback of the virtual viewpoint image at a first playback speed becomes lower than a speed of change of the virtual viewpoint which is changed in accordance with acceptance of an input according to the specific user operation during playback of the virtual viewpoint image at a second playback speed higher than the first playback speed.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain principles of the disclosure.

FIG. 5A is a flowchart illustrating an example of the processing of the information processing apparatus according to the first embodiment;

FIG. 7 is a table showing an example of camera parameters transmitted by a communication unit to a virtual viewpoint image generating server or a recording/editing apparatus according to the second embodiment;

DESCRIPTION OF THE EMBODIMENTS

Embodiments will be described below with reference to accompanying drawings. Note that the arrangements shown in the embodiments to be described below are merely examples, and the present disclosure is not limited to the illustrated arrangements.

First Embodiment

<Outline>

In the first embodiment, an example will be described in which the playback speed of a virtual viewpoint image is changed between when a camera path of a virtual camera is created and when the camera path is reproduced. More specifically, when creating a camera path, the camera path is created by operating and moving a virtual camera corresponding to a virtual viewpoint while playing back a virtual viewpoint image for twice the actual time (at the 0.5× speed). By the operator designating the playback speed suited for creating the camera path, it becomes possible to precisely move the virtual camera, and this makes it easy to follow an object included in the virtual viewpoint image. Further, the operator can also designate the playback speed at the time of reproducing the camera path. For example, the virtual viewpoint image is played back for the actual time (twice the 0.5× speed at the time of creating the camera path). This makes it possible to play back the comfortable virtual viewpoint image. The camera path is an example of viewpoint information indicating a temporal change of the virtual viewpoint corresponding to the virtual viewpoint image.

<Configuration of Image Processing System>

Figure 1A:
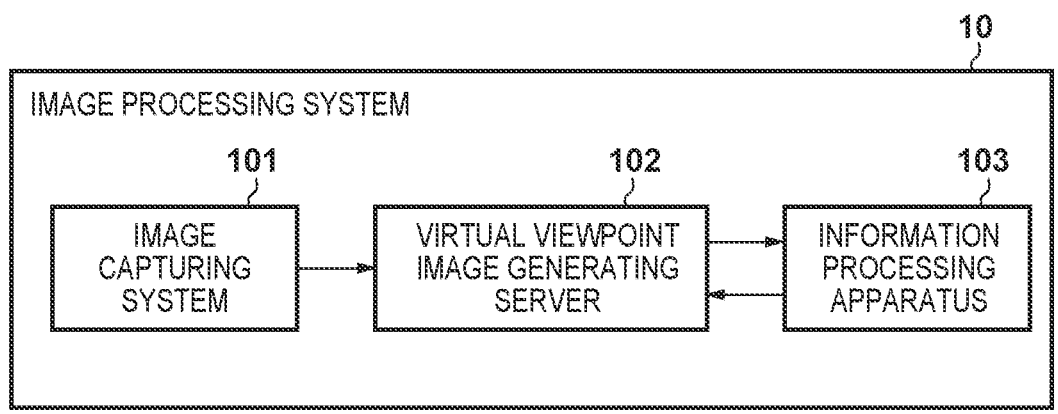
FIG. 1A is a block diagram showing an example of the overall configuration of an image processing system according to the first embodiment.

FIG. 1A is a block diagram showing the overall configuration of an image processing system 10 according to this embodiment. The image processing system 10 includes an image capturing system 101, a virtual viewpoint image generating server 102, and an information processing apparatus 103. The image processing system 10 can generate a virtual viewpoint image.

The image capturing system 101 includes a plurality of cameras installed in different positions, and synchronously captures a plurality of images from multiple viewpoints. Then, the plurality of images synchronously captured from the multiple viewpoints are transmitted to the virtual viewpoint image generating server 102.

The virtual viewpoint image generating server 102 generates, based on the plurality of images synchronously captured from the multiple viewpoints, a virtual viewpoint image observed from a virtual camera, which is a virtual camera corresponding to a virtual viewpoint movable in the image capturing space. That is, the virtual viewpoint image generating server 102 can generate a virtual viewpoint image that also includes an image observed from a viewpoint different from that of any camera included in the image capturing system 101. The viewpoint of the virtual camera is expressed by camera parameters determined by the information processing apparatus 103 to be described later.

The virtual viewpoint image generating server 102 sequentially generates a virtual viewpoint image from the plurality of received images. That is, the virtual viewpoint image generating server 102 can generate a live virtual viewpoint image. Note that the live virtual viewpoint image that can be generated by the image processing system 10 is a virtual viewpoint image based on a plurality of images captured by the image capturing system 101 at the time determined in consideration of the processing delay in the image capturing system 101 and the virtual viewpoint image generating server 102 with respect to the current time.

Further, the virtual viewpoint image generating server 102 includes a database, and has a function of recording the plurality of received images. Hence, the virtual viewpoint image generating server 102 can generate a replay virtual viewpoint image. A replay virtual viewpoint image is a virtual viewpoint image based on images captured by the image capturing system 101 at an arbitrary time, for example, a virtual viewpoint image that is played back when the created camera path is reproduced. Note that unless otherwise stated, the word "image" used in the description includes both the concept of a moving image and the concept of a still image. That is, the image processing system 10 can process both a still image and a moving image.

The information processing apparatus 103 controls the virtual camera and determines camera parameters representing the viewpoint of the virtual camera. The camera parameters of the virtual camera include at least parameters for designating the position, posture, and time of the virtual camera. The camera parameters of the virtual camera may further include the zoom. The time of the camera parameter is the time between the play start time and the play end time to be described later with reference to FIG. 3. This time may be expressed in a format such as 20xx year x month x day x hour x minute x second, or may be expressed as the time obtained when the play start time is used as the reference (zero).

The position of the virtual camera designated by the camera parameters may be a position indicating a set of three-dimensional coordinates. In addition, a position designated by the camera parameters of the virtual camera may be indicated by the respective coordinates of X-, Y-, and Z-axes of a three-axis Cartesian coordinate system. In this case, a position designated by the camera parameters of the virtual camera is a position indicating the set of coordinates and may be formed from parameters of three axes, that is, the X-axis, the Y-axis, and the Z-axis. Note that an arbitrary position in the image capturing space may be set as the origin.

The posture of the virtual camera designated by the camera parameters can be indicated by an angle formed by three axes of pan, tilt, and roll. In this case, the posture of the virtual camera designated by camera parameters may be formed from parameters of three axes which are pan, tilt, and roll. The zoom of the virtual camera designated by the camera parameters is indicated by, for example, the focal distance as one axis, and the zoom and the time each are defined as a parameter of one axis.

Hence, the camera parameters of the virtual camera can include at least parameters of eight axes. The information processing apparatus 103 can control these eight axes. Note that the camera parameters may include parameters defining other elements and may not include all of the above-described parameters of eight axes.

The information processing apparatus 103 transmits the determined camera parameters of the virtual camera to the virtual viewpoint image generating server 102. Next, the virtual viewpoint image generating server 102 generates a virtual viewpoint image based on the received camera parameters and transmits the generated virtual viewpoint image to the information processing apparatus 103. Note that it may be arranged so that a live virtual viewpoint image and a replay virtual viewpoint image will be generated by one information processing apparatus 103 in the manner of this embodiment or it may be arranged so that the live virtual viewpoint image and the replay virtual viewpoint image will be generated in different apparatuses by preparing two information processing apparatuses.

Figure 2:
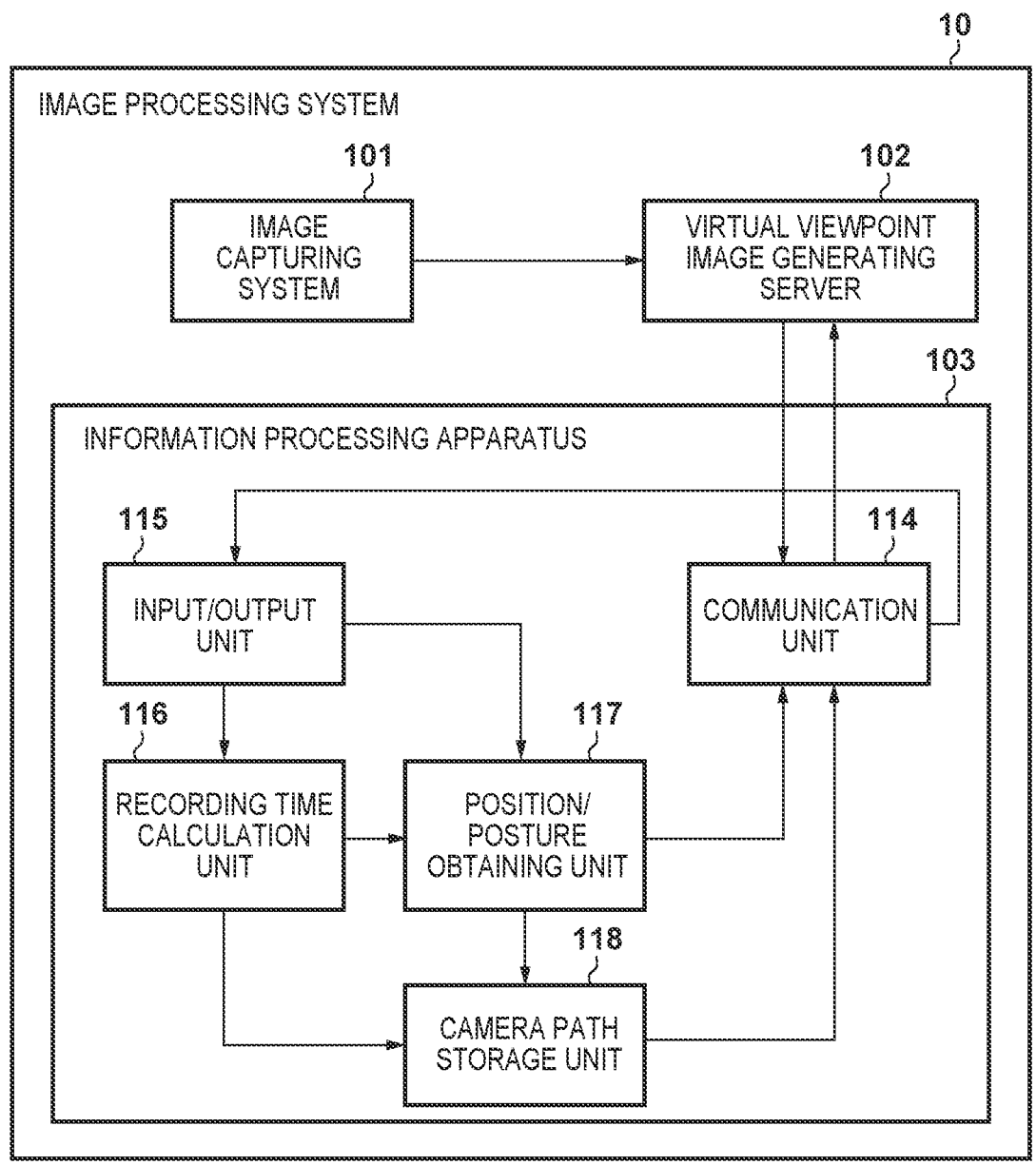
FIG. 2 is a block diagram showing an example of the arrangement of the information processing apparatus according to the first embodiment.

Note that the configuration of the image processing system 10 is not limited to that shown in FIG. 2. For example, the information processing apparatus 103 may include the virtual viewpoint image generating server 102.

<Hardware Arrangement of Information Processing Apparatus>

Figure 1B:
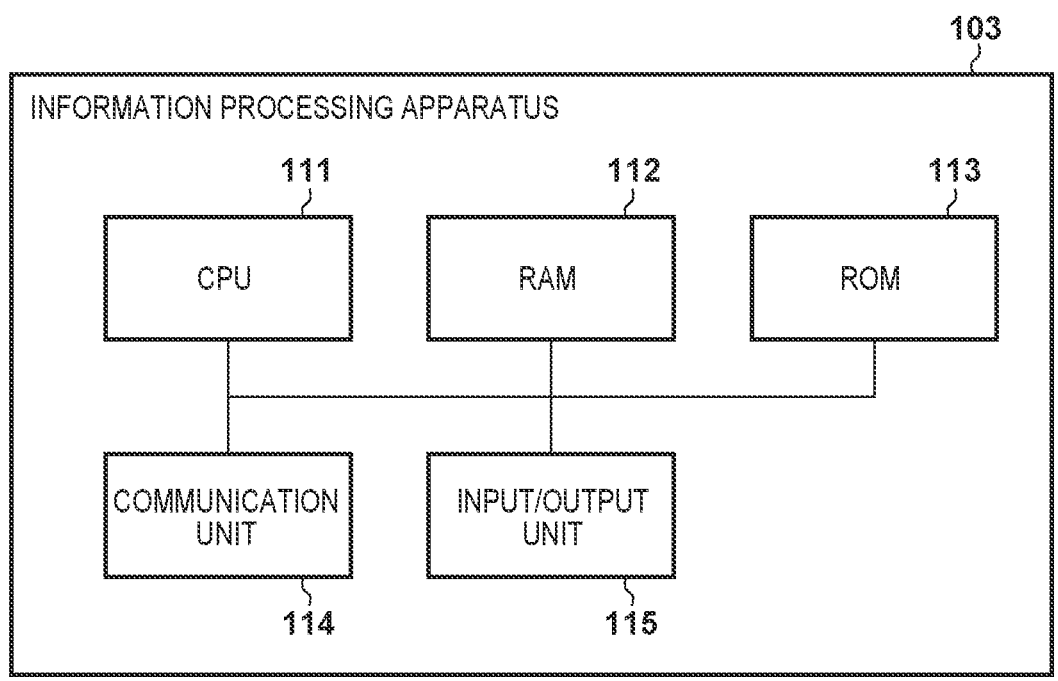
FIG. 1B is a block diagram showing an example of the hardware arrangement of an information processing apparatus.

FIG. 1B is a block diagram showing an example of the hardware arrangement of the information processing apparatus 103 according to this embodiment. The information processing apparatus 103 includes a CPU 111, a RAM 112, a ROM 113, a communication unit 114, and an input/output unit 115.

The CPU 111 controls the overall operation of the information processing apparatus 103 by reading out and executing computer programs and data stored in the RAM 112 and the ROM 113. The RAM 112 temporarily stores the computer program read out from the ROM 113, intermediate results of a calculation or the like, data supplied from the outside via the communication unit 114, and the like. Note that the ROM 113 holds the computer programs and data that need not be changed. Note that the RAM 112 and the ROM 113 are collectively referred to as memories.

The communication unit 114 includes a communication unit of an Ethernet®, a USB, or the like, and communicates with the virtual viewpoint image generating server 102. The input/output unit 115 includes a plurality of controllers for controlling the virtual camera and a plurality of display units for outputting and displaying the state of the virtual camera and the like. The controllers are, for example, operation units such as a joystick, a jog dial, a touch panel, a keyboard, and a mouse, and each controller can accept an input according to a user operation of the operator. For example, by operating the joystick, the operator can freely move the position of the virtual camera in space or freely change the orientation and angle of view of the virtual camera in the virtual viewpoint image which is played back when creating the camera path. More specifically, the operator can create the camera path by moving the virtual camera so as to follow the side of a specific player on the court while observing the virtual viewpoint image played back when creating the camera path.

<Functional Arrangement of Information Processing Apparatus>

FIG. 2 is a block diagram showing an example of the functional arrangement of the information processing apparatus 103 which forms the image processing system 10 according to this embodiment. The information processing apparatus 103 includes the communication unit 114, the input/output unit 115, a recording time calculation unit 116, a position/posture obtaining unit 117, and a camera path storage unit 118. The information processing apparatus 103 is connected to the virtual viewpoint image generating server 102.

The communication unit 114 sequentially outputs, to the virtual viewpoint image generating server 102 or the input/output unit 115, camera parameters input from the position/posture obtaining unit 117 or the camera path storage unit 118 using the communication unit of an Ethernet, a USB, or the like. Further, the communication unit 114 may sequentially outputs, to the input/output unit 115, a virtual viewpoint image input from the virtual viewpoint image generating server 102 using the communication unit of an Ethernet, a USB, or the like.

The input/output unit 115 outputs, to the recording time calculation unit 116, camera parameters or the mode of the virtual viewpoint image, which are input by the operator using the controller. Further, the input/output unit 115 outputs, to the position/posture obtaining unit 117, the initial position, initial posture, or movement instruction amount of the virtual camera. The movement instruction amount is, for example, the distance in the tilt direction corresponding to the operation amount (tilt amount) of the joystick as the controller. Alternatively, the movement instruction amount may be the amount corresponding to the number of times the joystick is tilted. In this case, it may be determined in advance that a predetermined distance is moved by one tilt. Alternatively, if the movement amounts in the x, y, and z directions with respect to the current position are input from the controller, those values may be used. The operator of the virtual camera can designate the camera parameter of the virtual camera or the movement instruction amount of the virtual camera by operating the controller. The details of the mode of the virtual viewpoint image will be described later.

Further, the input/output unit 115 outputs, to the recording time calculation unit 116, the play start time and the play end time of a replay virtual viewpoint image based on the image capturing time (play time hereinafter) by the image capturing system 101, which are input by the operator using the controller. Each of the play start time and the play end time is determined by, for example, the video producer indicating, to the operator of the virtual camera, the actual time to be used for playback of the video obtained by capturing a game of soccer or the like, and the operator inputting the actual time to the input/output unit 115 using the controller. Note that the video producer and the operator of the virtual camera are not necessarily different persons, and the video producer and the operator of the virtual camera may be the same person. Further, the method of determining the play start time and the play end time is not limited to this example, and they may be determined by the image processing system 10 automatically extracting the actual start time and the actual end time of a characteristic scene such as a goal scene.

Further, the input/output unit 115 outputs, to the recording time calculation unit 116, the information of the playback speed of the virtual viewpoint image at the time of creating the camera path and/or the information of the playback speed of the virtual viewpoint image at the time of reproducing the camera path, which are input by the operator using the controller. Furthermore, the input/output unit 115 outputs, to the position/posture obtaining unit 117, the moving speed of the virtual camera input by the operator using the controller. The playback speed of the virtual viewpoint image at the time of creating the camera path is assumed to be determined by the ratio based on the speed of the actual time, but the concept of the playback speed is not limited to this. In addition, the playback speed of the virtual viewpoint image at the time of reproducing the camera path is assumed to be determined by the ratio based on the frame rate (for example, 60 fps) for registering the camera parameters at the time of creating the camera path, but the present disclosure is not limited to this. Further, the moving speed of the virtual camera is assumed to be determined by the ratio based on the human running speed (for example, 10 m/s), but the concept of the moving speed is not limited to this. Note that the playback speed of the virtual viewpoint image is not limited to be determined based on the designation operation by the user, and it may be automatically determined. For example, the playback speed of the virtual viewpoint image may be determined based on movement of an object included in at least any of the plurality of captured images obtained by the image capturing system 101.

In addition, the input/output unit 115 includes the display unit such as the plurality of displays, and displays the virtual viewpoint image, the camera parameters, and the state of the virtual camera, which have been input from the communication unit 114. This enables the operator to operate the virtual camera using the controller while observing the virtual viewpoint image displayed on the display unit. However, the present disclosure is not limited to this, and the operator who operates the display unit and the operator who operates the controller may not be the same person.

The information processing apparatus 103 includes at least two modes for controlling the playback speed of the virtual viewpoint image. One is a camera path creation mode, and the other is a camera path reproduction mode. It may be configured such that, for example, a switching button is provided on a user interface (UI) as the input/output unit 115 and the mode can be switched in accordance of pressing of the button.

<Camera Path Creation Mode>

The camera path creation mode is a mode in which the virtual camera is moved in the image capturing space based on the operation of the operator while the virtual viewpoint image (video) being played back is observed from the virtual viewpoint at which the virtual camera is located, and the movement locus of the virtual camera is stored as a camera path. In other words, the camera path creation mode is a mode in which the virtual viewpoint corresponding to the virtual viewpoint image being played back is changed in accordance with the user operation during playback of the virtual viewpoint image, and the viewpoint information indicating the change of the virtual viewpoint in accordance with the user operation is stored.

In the camera path creation mode, the recording time calculation unit 116 determines, based on the camera parameters, the play start time, the play end time, and the playback speed of the virtual viewpoint image at the time of creating the camera path, which have been input from the input/output unit 115, the actual time of the virtual viewpoint image to be generated. Then, the time included in the camera parameter is updated. Further, the recording time calculation unit 116 adds, to the camera parameter, the actual time at which the camera path information is recorded (camera parameter recording time), and outputs the camera parameter to the position/posture obtaining unit 117. Here, the time of the camera parameter and the camera parameter recording time are different pieces of information.

The time of the virtual viewpoint image to be generated is started from the play start time. When the time of the virtual viewpoint image to be generated is updated, the time is determined based on the time of the previously generated virtual viewpoint image and the playback speed of the virtual viewpoint image. It is assumed that the time of the virtual viewpoint image to be generated shall not exceed the play end time. Note that the method of determining the time is not limited to this. Further, the first camera parameter recording time (camera path recording start time) and the last camera parameter recording time (camera path recording end time) are stored in the memory.

<Camera Path Reproduction Mode>

The camera path reproduction mode is a mode in which the virtual viewpoint image (video) along the created camera path is generated. In the camera path reproduction mode, the recording time calculation unit 116 calculates, based on the playback speed of the virtual viewpoint image at the time of reproducing the camera path, which has been input from the input/output unit 115, the camera parameter recording time of the virtual viewpoint image to be generated. Then, the recording time calculation unit 116 outputs the calculated camera parameter recording time to the camera path storage unit 118. In the method of calculating the camera parameter recording time, for example, the time is started from the camera path recording start time stored in the memory and, if the camera path playback speed is the 1× speed, the time is advanced at the same speed as when recording the camera path, and if the camera path playback speed is the 2× speed, the time is advanced at twice the speed in recording the camera path. Note that the method of calculating the camera parameter recording time is not limited to this.

The position/posture obtaining unit 117 calculates and obtains, based on the movement instruction amount and the moving speed, initial position, and initial posture of the virtual camera, which have been input from the input/output unit 115, and the camera parameters input from the recording time calculation unit 116, the position and posture of the virtual camera of the virtual viewpoint image to be generated. Then, the position/posture obtaining unit 117 updates the position and posture of the camera parameters, and outputs the information of the updated camera parameters to the communication unit 114 and the camera path storage unit 118. The position and posture of the virtual camera are started from the initial position and the initial posture, respectively. When updating the position and the posture, they are assumed to be determined based on the position and posture of the camera parameters of the previously generated virtual viewpoint image, the movement instruction amount, and the moving speed of the virtual camera. Note that the method of determining the position and posture of the virtual camera is not limited to this.

The camera path storage unit 118 sequentially stores the camera parameters of the virtual camera input from the position/posture obtaining unit 117. Further, the camera path storage unit 118 obtains, based on the camera parameter recording time input from recording time calculation unit 116, the camera parameters at this recording time from the camera parameters stored in the memory, and outputs them to the communication unit 114.

<Playback of Virtual Viewpoint Image when Creating Camera Path and Reproducing Camera Path>

Figure 3:
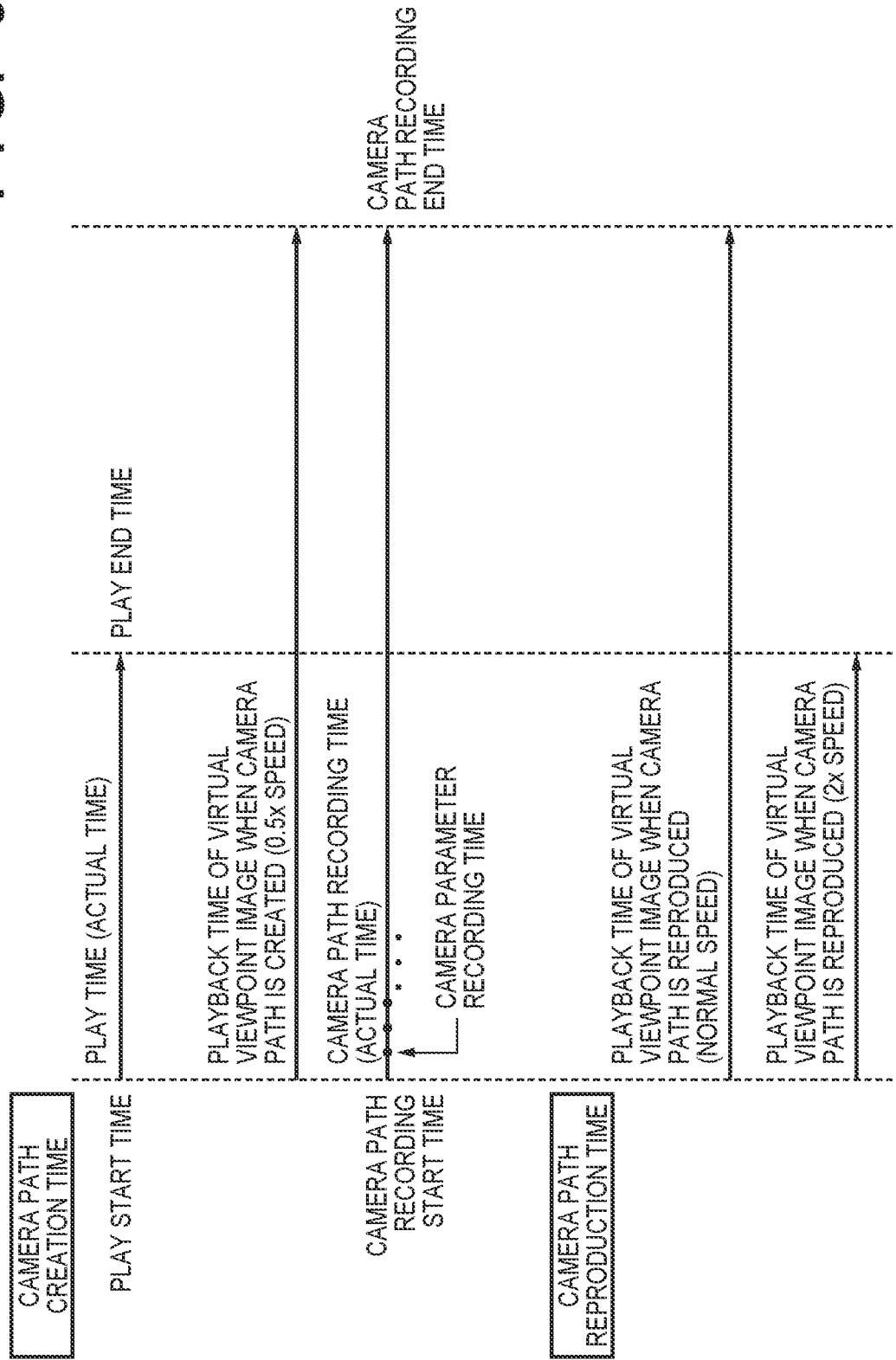
FIG. 3 is a view showing an example of the concept of time according to the first embodiment.

Here, FIG. 3 is an image view of the time axis according to the first embodiment in a case in which the virtual viewpoint image is played back at the 0.5× playback speed when creating the camera path and the virtual viewpoint image is played back at two speeds (the normal speed (1× speed) and the 2× speed) when reproducing the camera path.

For example, the play time (actual time) of a sport is defined as the time from the play start time to the play end time. For example, this assumes a highlight scene of soccer or the like. Since the playback speed of the virtual viewpoint image at the time of creating the camera path is the 0.5 speed, its playback time becomes twice the play time. The camera path recording time is the actual time, and the same length as the playback time of the virtual viewpoint image at the time of creating the camera path. That is, the camera path recording time is twice the play time.

In a case of the normal speed (1× speed), the playback time of the virtual viewpoint image at the time of reproducing the camera path is the same length as the playback time of the virtual viewpoint image and the camera path recording time at the time of creating the camera path. That is, the playback time of the virtual viewpoint image at the time of reproducing the camera path is twice the play time. In a case of the 2× speed, the playback time of the virtual viewpoint image at the time of reproducing the camera path is the same length as the play time.

That is, if the playback speed of the virtual viewpoint image at the time of reproducing the camera path is the normal speed (1× speed), the playback speed of the replay virtual viewpoint image is made to be twice the play time.

If the playback speed of the virtual viewpoint image at the time of reproducing the camera path is the 2× speed, the playback time of the replay virtual viewpoint image is made to be the same length as the play time.

With this arrangement, in a case in which the object moves fast, the operator can create the camera path while decreasing the playback speed of the virtual viewpoint image in the camera path creation mode (for example, at the 0.5× speed) to facilitate following the object. To the contrary, in a case in which the object moves too slowly (for example, observing a slowly moving animal, observing the emergence of an insect, or the like), the operator can create the camera path while increasing the playback speed of the virtual viewpoint image in the camera path creation mode to facilitate following the object.

Conventionally, the camera path can be reproduced only for the time equal to the camera path recording time. However, according to this embodiment, it becomes possible to reproduce the created camera path for the play time (or an arbitrary time). That is, in the camera path reproduction mode in which a virtual viewpoint image generated based on a created camera path and a plurality of captured images is played back, by setting the playback speed different from the playback speed in the camera path creation mode (for example, twice the playback speed in the camera path creation mode), the virtual viewpoint image can be played back at the playback speed suitable for viewing.

<Processing>

Figure 4:
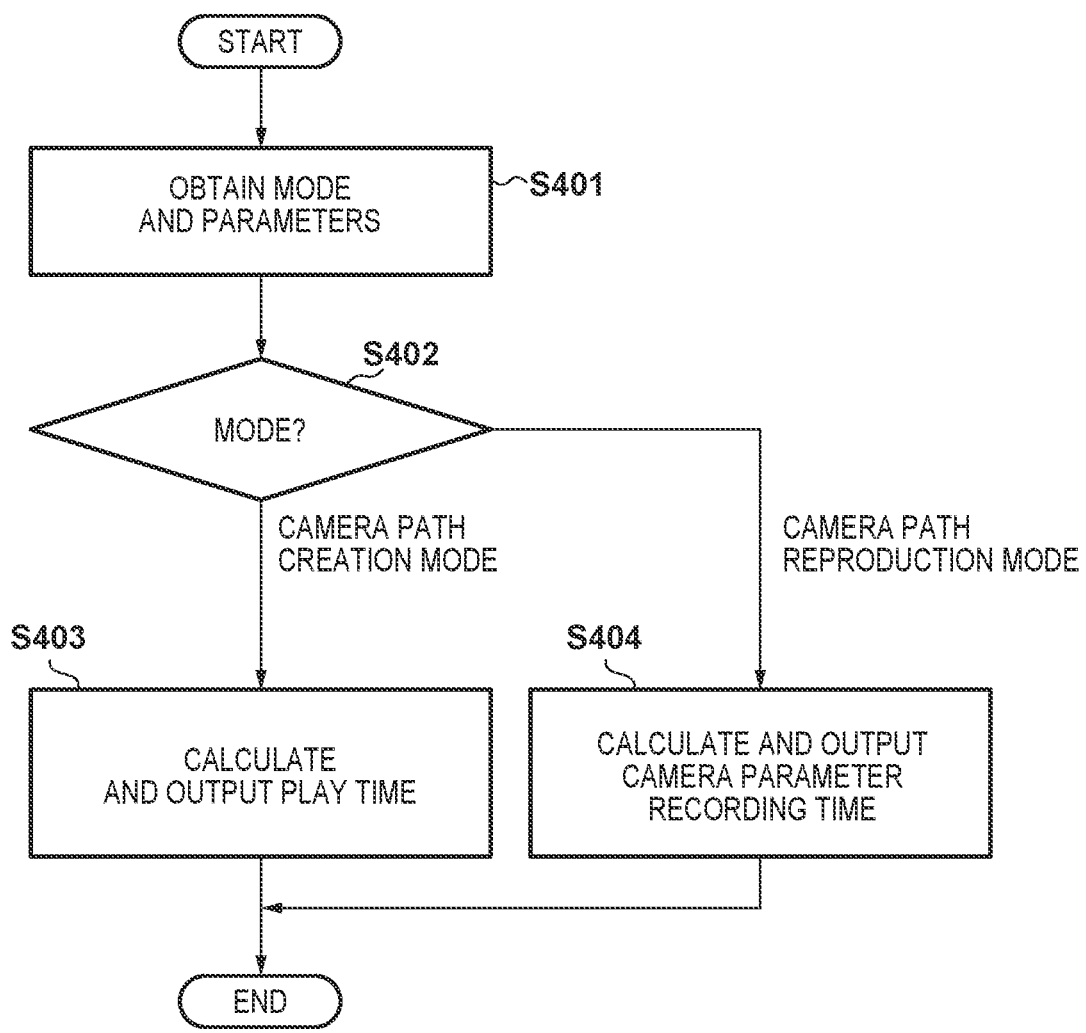
FIG. 4 is a flowchart illustrating an example of the processing of a recording time calculation unit according to the first embodiment.

FIG. 4 is a flowchart illustrating the procedure of switching processing between the camera path creation mode at the time of creating a camera path and the mode at the time of reproducing the camera path, which is performed by the recording time calculation unit 116 of the information processing apparatus 103 according to the first embodiment.

In step S401, the recording time calculation unit 116 obtains, from the input/output unit 115, the mode of playback speed of the virtual viewpoint image and various kinds of parameters. In step S402, the recording time calculation unit 116 determines the kind of the mode obtained in step S401. If the mode is the camera path creation mode, the process advances to step S403. On the other hand, if the mode is the camera path reproduction mode, the process advances to step S404. In step S403, the recording time calculation unit 116 calculates the play time, and updates the camera parameters. Then, the camera parameters are output to the position/posture obtaining unit 117. In step S404, the recording time calculation unit 116 calculates the camera parameter recording time for generating the virtual viewpoint image, and outputs it to the camera path storage unit 118. Thus, a series of processing illustrated in FIG. 4 is terminated.

<Processing when Creating Camera Path>

Next, FIG. 5A is a flowchart illustrating the procedure of the processing at the time of creating a camera path performed by the information processing apparatus according to the first embodiment.

In step S501, the input/output unit 115 obtains, as initial parameters, the camera parameters (position, posture, and time), the initial position and initial posture of the virtual camera, and the start time and end time of a replay virtual viewpoint image. In step S502, the input/output unit 115 obtains, as parameters, the movement instruction amount of the virtual camera, the playback speed of the virtual viewpoint image at the time of creating the camera path, and the moving speed of the virtual camera. In step S503, the input/output unit 115 checks the obtained data. If the input/output unit 115 can check the obtained data, the process advances to step S504. If the input/output unit 115 cannot check the obtained data, the process is terminated.

In step S504, the recording time calculation unit 116 determines, based on the camera parameters, the start time and the end time, and the playback speed of the virtual viewpoint image, all of which are obtained by the recording time calculation unit 116, the play time of the virtual viewpoint image to be generated, and updates the time of the camera parameter. Note that the time is started from the play start time, and shall not exceed the play end time.

In step S505, the position/posture obtaining unit 117 calculates, based on the movement instruction amount, the moving speed, initial position, and initial posture of the virtual camera, and the camera parameters, all of which are obtained by the position/posture obtaining unit 117, the position and posture of the virtual camera of the virtual viewpoint image to be generated, and updates the position and posture of the camera parameters. The position and posture of the virtual camera are started from the initial position and the initial posture, respectively. When updating the position and the posture, they are determined based on the position and posture of the previous camera parameters, the movement instruction amount, and the moving speed of the virtual camera.

In step S506, the camera path storage unit 118 records the determined camera parameters in the memory. In step S507, the communication unit 114 transmits, to the virtual viewpoint image generating server 102, the camera parameters at the viewpoint of the virtual camera at the updated movement destination, and instructs to generate the virtual viewpoint image. Based on the information of the time included in the camera parameters, the virtual viewpoint image generating server 102 determines the time of the virtual viewpoint image to be generated, and generates the virtual viewpoint image at the position and posture of the virtual camera at the determined time.

In step S508, the communication unit 114 receives, from the virtual viewpoint image generating server 102, the virtual viewpoint image generated by the virtual viewpoint image generating server 102.

In step S509, the input/output unit 115 displays the received virtual viewpoint image on the display unit such as the display. Then, the process returns to step S502. The operator of the virtual camera can operate and move the virtual camera using the controller of the input/output unit 115 in step S502 while observing the virtual viewpoint image. The movement locus of the virtual camera is created as the camera path. Further, if needed, the operator can adjust the playback speed of the virtual viewpoint image or the moving speed of the virtual camera in step S502 using the controller of the input/output unit 115. Note that in the example shown in FIG. 3, the camera path is generated at the constant playback speed, so that a series of processing is repeated without changing the playback speed from the fixed value. Thus, the series of processing illustrated in FIG. 5A is terminated.

<Processing when Reproducing Camera Path>

Figure 5B:
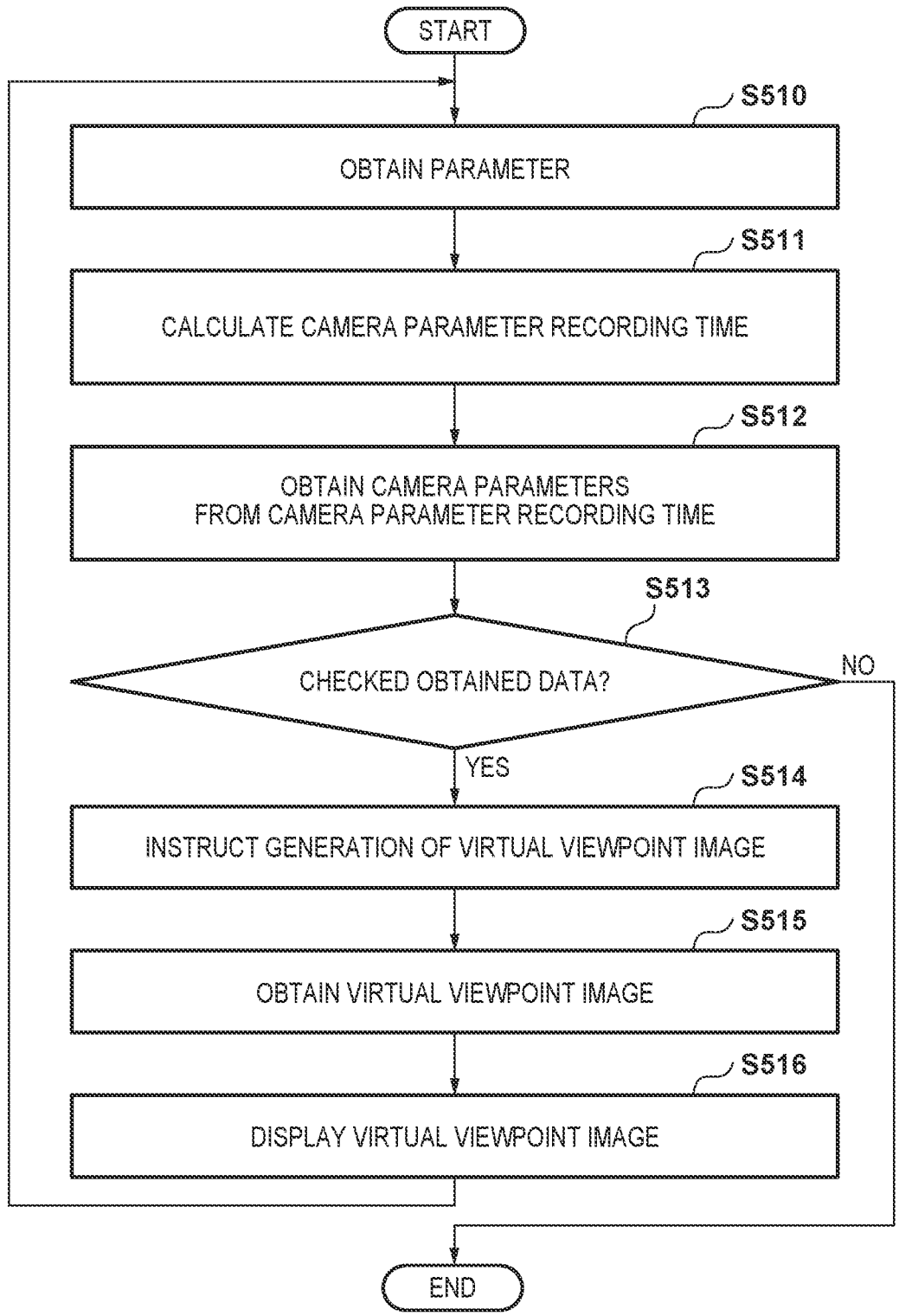
FIG. 5B is a flowchart illustrating an example of the processing of the information processing apparatus according to the first embodiment.

Next, FIG. 5B is a flowchart illustrating the procedure of the processing at the time of reproducing the camera path performed by the information processing apparatus according to the first embodiment.

In step S510, the input/output unit 115 obtains, as a parameter, the information of the playback speed of the virtual viewpoint image at the time of reproducing the camera path. In step S511, the recording time calculation unit 116 calculates, based on the obtained information of the playback speed of the virtual viewpoint image, the camera parameter recording time. The camera parameter recording time is started from the camera path recording start time.

In step S512, the camera path storage unit 118 obtains, from the camera path recorded in the memory in step S506, the camera parameters corresponding to the camera parameter recording time calculated in step S511. In step S513, the camera path storage unit 118 checks the data obtained in step S512. If the camera path storage unit 118 can check the obtained data, the process advances to step S514. On the other hand, if the camera path storage unit 118 cannot check the obtained data, the process is terminated.

In step S514, the communication unit 114 transmits the obtained camera parameters to the virtual viewpoint image generating server 102, and instructs to generate the virtual viewpoint image. Based on the information of the time included in the camera parameters, the virtual viewpoint image generating server 102 determines the time of the virtual viewpoint image to be generated, and generates the virtual viewpoint image at the position and posture of the virtual camera at the determined time. In step S515, the communication unit 114 receives, from the virtual viewpoint image generating server 102, the virtual viewpoint image generated by the virtual viewpoint image generating server 102.

In step S516, the input/output unit 115 displays the received virtual viewpoint image on the display unit such as the display. Then, the process returns to step S510. The operator of the virtual camera can adjust the playback speed of the virtual viewpoint image at the time of reproducing the camera path using the controller of the input/output unit 115 in step S510 while observing the virtual viewpoint image. This enables play back of the virtual viewpoint image at a low playback speed in a highlight scene which is regarded as important by the operator, and play back the virtual viewpoint image at a high playback speed in a scene which is not regarded as important. Note that in the example shown in FIG. 3, the camera path is reproduced at the constant playback speed, so that a series of processing is repeated without changing the playback speed from the fixed value. Thus, the series of processing illustrated in FIG. 5B is terminated.

As has been described above, in this embodiment, processing is performed in which the information of the playback speed of a virtual viewpoint image in the camera path creation mode for creating a camera path that represents the movement locus of a virtual camera capable of freely moving the image capturing space while playing back the virtual viewpoint image is obtained, and an operation is accepted for creating the camera path by moving the virtual camera in the virtual viewpoint image from the viewpoint of the virtual camera currently being played back at the obtained playback speed.

With this processing, it is possible to adjust, at the time of creating the camera path, the playback speed of the virtual viewpoint image to a suitable speed according to the speed of the object. For example, in a case in which the object moves fast, by decreasing the playback speed of the virtual viewpoint image and operating the virtual camera, the operator can easily follow the movement of the object, and easily create the camera path. To the contrary, in a case in which the object moves too slowly (for example, observing a slowly moving animal, observing the emergence of an insect, or the like), the operator can create the camera path while increasing the playback speed of the virtual viewpoint image to facilitate following the object.

Further, it is configured such that, in addition to the playback speed of the virtual viewpoint image at the time of creating the camera path, the playback speed of the virtual viewpoint image at the time of reproducing the camera path can also be adjusted to a preferable speed of the operator. Thus, it also becomes possible to reproduce the created camera path for the actual time (or an arbitrary time).

That is, it becomes easy to create a camera path at the time of creating the camera path, and a virtual viewpoint image based on the actual time and without discomfort can be provided at the time of reproducing the camera path.

Second Embodiment

In the second embodiment, an example will be described in which the information processing apparatus transmits some or all of camera parameters (the position, posture, time, and the like of a virtual camera) of a virtual viewpoint image to an external apparatus, and the external apparatus records and edits a replay virtual viewpoint image.

Figure 6:
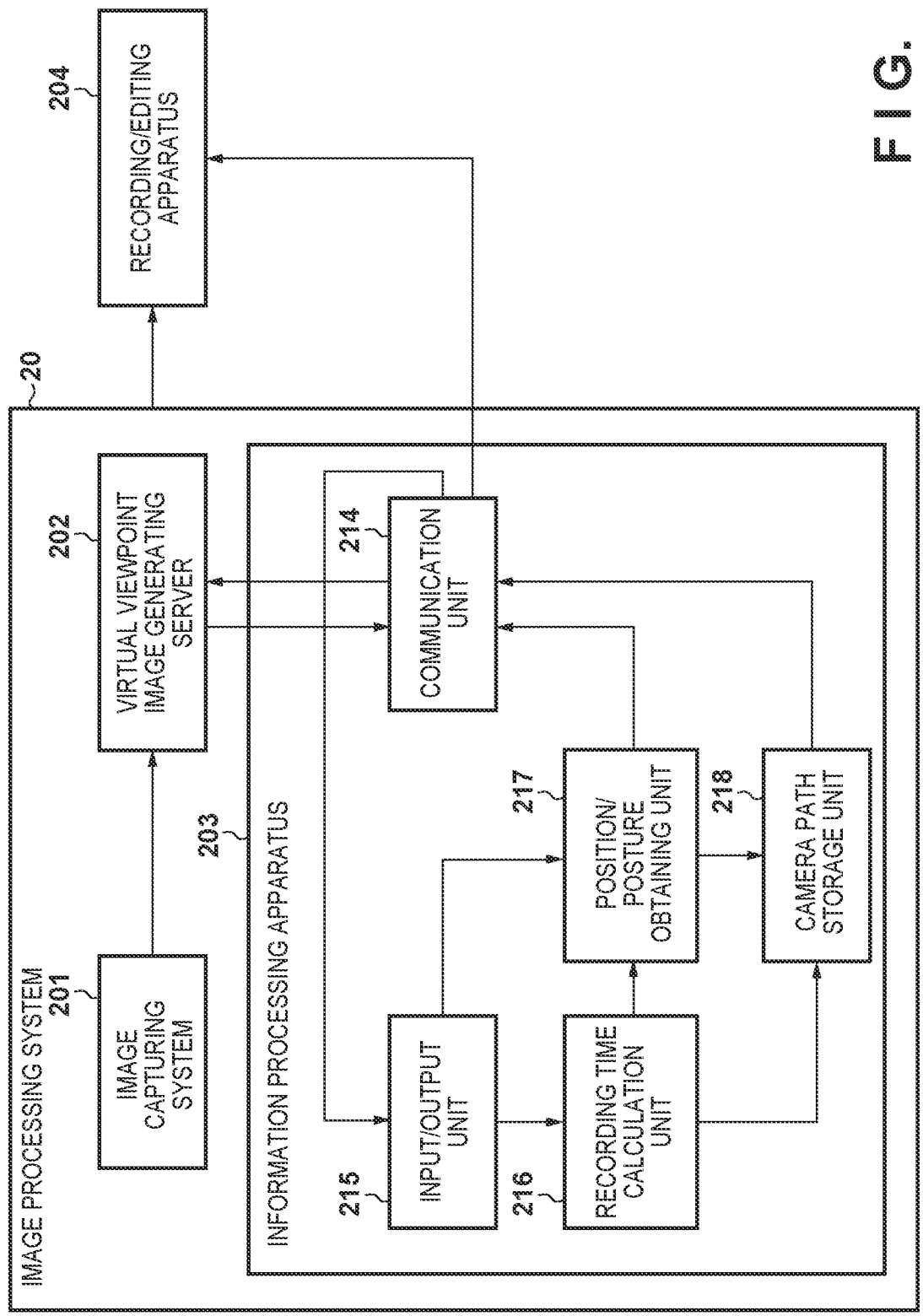
FIG. 6 is a block diagram showing an example of the arrangement of an information processing apparatus according to the second embodiment.

FIG. 6 is a block diagram showing a configuration example of an image processing system that generates a replay virtual viewpoint image using the external apparatus according to this embodiment. An image processing system 20 includes an image capturing system 201, a virtual viewpoint image generating server 202, and an information processing apparatus 203, and can communicate with a recording/editing apparatus 204 as the external apparatus. The information processing apparatus 203 includes a communication unit 214, an input/output unit 215, a recording time calculation unit 216, a position/posture obtaining unit 217, and a camera path storage unit 218.

The image capturing system 201 is similar to the image capturing system 101 shown in FIG. 2. The virtual viewpoint image generating server 202 may add, to a virtual viewpoint image, information of all or some of camera parameters input from the communication unit 214, and output the virtual viewpoint image to the recording/editing apparatus 204. The method of adding the information to the virtual viewpoint image is assumed to be performed by, for example, describing the information in the ancillary area of an SDI (Serial Digital Interface) signal, but the method is not limited to this.

The communication unit 214 has, in addition to the function of the communication unit 114 shown in FIG. 2, a function of sequentially transmitting, to the recording/editing apparatus 204, all or some of the camera parameters input from the position/posture obtaining unit 217 or the camera path storage unit 218 using a communication means of an Ethernet, an USB, or the like.

The input/output unit 215 is similar to the input/output unit 115 shown in FIG. 2. The recording time calculation unit 216 has, in addition to the function of the recording time calculation unit 116 shown in FIG. 2, a function of adding the playback speed of the virtual viewpoint image to the camera parameter. The position/posture obtaining unit 217 has, in addition to the function of the position/posture obtaining unit 117 shown in FIG. 2, a function of adding the moving speed of the virtual camera to the camera parameter. The camera path storage unit 218 is similar to the camera path storage unit 118 shown in FIG. 2.

The recording/editing apparatus 204 records the virtual viewpoint image input from the virtual viewpoint image generating server 202 or the communication unit 214. Further, the recording/editing apparatus 204 edits the virtual viewpoint image using the virtual viewpoint image input from the virtual viewpoint image generating server 202 or the communication unit 214 and all or some of the camera parameters input from the communication unit 214. Note that the pieces of information obtained here are the camera parameters, the information of the playback speed of the virtual viewpoint image, and the information of the moving speed of the virtual camera.

An example of the method of editing a virtual viewpoint image is a method in which the operator or the system refers to the information including the camera parameters (position, posture, time, and the like) of a virtual camera, the playback speed of the virtual viewpoint image, and the moving speed, and the virtual viewpoint image is played back at the 2× speed if the playback speed of the virtual viewpoint image is the 0.5× speed. This enables creation of a replay virtual viewpoint image played back for the actual time. Note that the method of editing a virtual viewpoint image is not limited to this.

FIG. 7 shows an example of camera parameters to be output by the communication unit 214 to the virtual viewpoint image generating server 202 or the recording/editing apparatus 204. However, the method of describing the camera parameters to be output is not limited to this. In the example shown in FIG. 7, the time is 01:02:03:00, the playback mode of the virtual viewpoint image is the camera path creation mode, the playback speed of the virtual viewpoint image is 0.5, the moving speed of the virtual camera is 0.5, the x position of the virtual camera is 100, and they position thereof is 200. Note that the parameters to be output from the communication unit 214 to the virtual viewpoint image generating server 202 or the recording/editing apparatus 204 are not limited to them. For example, information indicating the playback speed different from the playback speed in the camera path creation mode, which is information indicating the playback speed in the camera path reproduction mode, may be included in the parameters to be output.

With the processing as described above, it becomes possible that the information processing apparatus transmits, to an external apparatus (for example, the recording/editing apparatus), some or all of the camera parameters of a virtual viewpoint image, and the external apparatus records/edits a replay virtual viewpoint image.

According to this embodiment, a virtual viewpoint image and meta information thereof are sequentially output to the recording/editing apparatus in accordance with creation of a camera path. This enables faster recording and editing, so that faster video distribution becomes possible. Further, a third party existing outside the image processing system can use the recording/editing apparatus to perform recording/editing.

Third Embodiment

In the third embodiment, an example will be described in which the operator of a virtual camera changes a parameter related to the playback speed of a virtual viewpoint image or a parameter related to the moving speed of a virtual camera.

Figure 8:
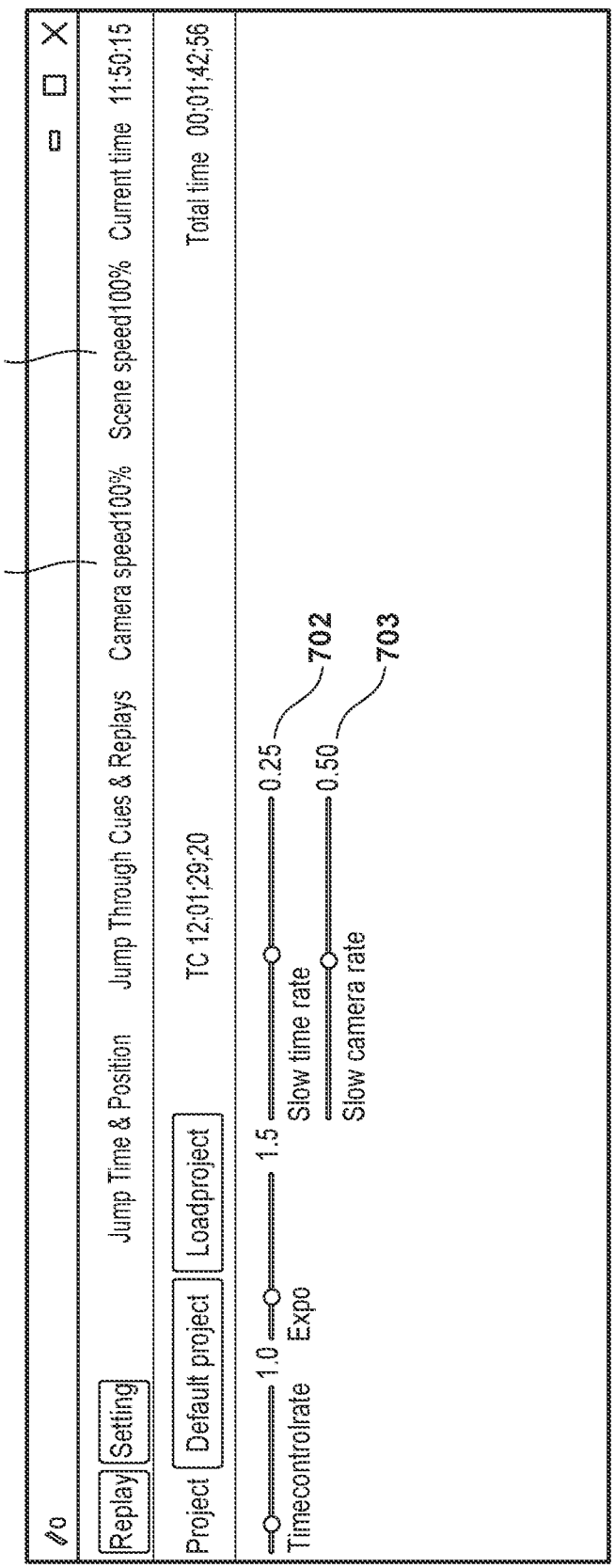
FIG. 8 is a view showing an example of a UI for generating a replay virtual viewpoint image according to the third embodiment.

FIG. 8 is an image view of a user interface (UI) used by the operator to change a parameter related to the playback speed of a virtual viewpoint image and a parameter related to the moving speed of a virtual camera according to this embodiment. The UI includes a scene playback speed 303, a virtual camera moving speed 404, a slow camera assist rate control bar 702, and a scene playback speed control bar 703.

The operator operates the slow camera assist rate control bar 702 as the parameter related to the moving speed of the virtual camera. Further, the operator operates the scene playback speed control bar 703 as the parameter related to the playback speed of the virtual viewpoint image. The slow camera assist rate control bar 702 and the scene playback speed control bar 703 operate independently. However, the operations of the slow camera assist rate control bar 702 and the scene playback speed control bar 703 are not limited to this. For example, it may be configured such that, if the operator operates the scene playback speed control bar 703 to change the playback speed of the virtual viewpoint image, the moving speed of the virtual camera suitable for the changed playback speed may be automatically calculated and reflected on the slow camera assist rate control bar 702, thereby causing the slow camera assist rate control bar 702 to synchronously operate.

The UI may be displayed on a display unit such as a display included in an input/output unit 115. The UI may be operated using an input unit such as a controller included in the input/output unit 115.

In FIG. 8, the scene playback speed 303 is the playback speed of the virtual viewpoint image input and displayed by the input/output unit 115, and this speed is output to a recording time calculation unit 116. "100%" means the normal playback speed. If the scene playback speed 303 is lower than 100%, slow playback is performed. For example, if a video of one sec for the actual time is played back for two sec, the scene playback speed 303 is 50%. If the scene playback speed 303 is higher than 100%, fast-forward playback is performed. If the scene playback speed 303 is 0%, the virtual viewpoint image displayed on the input/output unit 115 is stopped. Note that even if the scene playback speed 303 is 0%, it is possible to control the virtual camera. For example, it is possible to generate a virtual viewpoint image that captures the whole circumference of the player at the moment the player kicks the ball.

The slow camera assist rate 404 is the ratio of decreasing the moving speed of the camera input and displayed by the input/output unit 115 when a slow camera assist function is enabled, and is output to a position/posture obtaining unit 117. At this time, the moving speed of the virtual camera is automatically determined in accordance with the playback speed of the virtual viewpoint image in the camera path creation mode. That is, it is configured such that the moving speed of the virtual camera is automatically changed in accordance with the change of the scene playback speed (the playback speed of the virtual viewpoint image).

For example, if the scene playback speed is changed to 50%, the moving speed of the virtual camera according to the user operation during playback of the virtual viewpoint image at the changed playback speed may be decreased to 50% of the normal moving speed. Further, for example, if the scene playback speed is changed to 25%, the moving speed of the virtual camera may be decreased to 25% of the normal moving speed. The slow camera assist decreases both the scene playback speed and the moving speed of the virtual camera, and this facilitates the operation for recording a replay clip. For example, this facilitates the operation of the virtual camera when creating a replay clip for following a fast-moving ball. Note that if the scene playback speed is set to 100% or higher to perform fast forward, the moving speed of the virtual camera may also be set to be equal to or higher than the normal speed.

The slow camera assist rate control bar 702 controls the moving speed of the virtual camera to be input and displayed by the input/output unit 115 during execution of the slow camera assist, and is output to the position/posture obtaining unit 117. The scene playback speed control bar 703 controls the scene playback speed input and displayed by the input/output unit 115, and is output to the recording time calculation unit 116.

Figure 9:
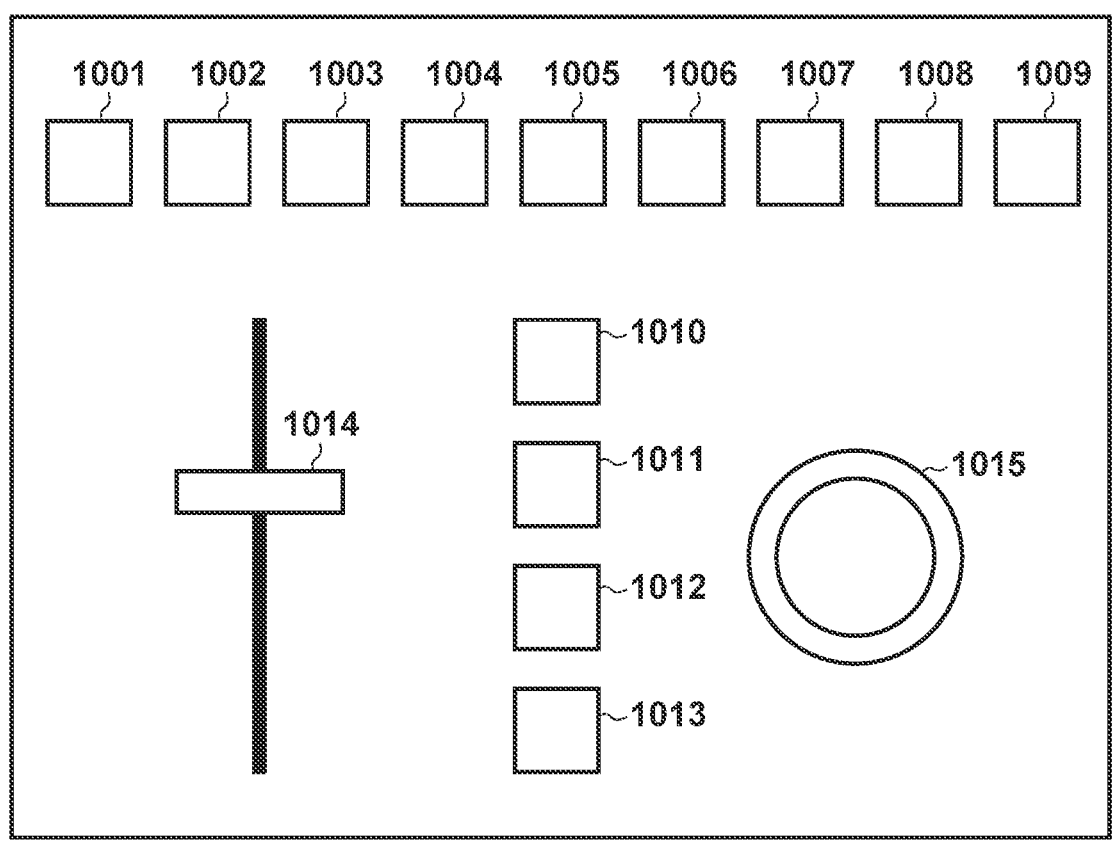
FIG. 9 is a view showing an example of a controller according to the third embodiment.

The function of each of the slow camera assist rate control bar 702 and the scene playback speed control bar 703 may be implemented not only in the form of a bar as shown in FIG. 8, but also in the form of, for example, selection using a pull-down menu or direct input using a text box. Further, the controller included in the input/output unit 115 may be used. Here, FIG. 9 is a view showing an example of a window as the controller for operating the slow camera assist rate or the scene playback speed according to this embodiment. A slider 1014 is assumed to be used to set the slow camera assist rate or the scene playback speed.

Note that the slider 1014 may be synchronized with the slow camera assist rate control bar 702 or the scene playback speed control bar 703. Further, a value may be set in advance in each of buttons 1001 to 1013. By pressing the button, the value of the slow camera assist rate or the scene playback speed may be replaced by the set value, and the set value may be reflected by pressing a determination button 1015. However, the setting method using the controller is not limited to this.

With the processing as described above, the operator of the virtual camera can easily change the parameter related to the playback speed of the virtual viewpoint image or the parameter related to the moving speed of the virtual camera.

Note that each of the above-described embodiments has been described while taking the camera path creation mode as an example. However, the present disclosure is applicable to not only when creating a camera path but also when operating a virtual camera. For example, by changing the moving speed of the virtual camera (the moving amount of the virtual camera according to the user operation) in accordance with the playback speed of the virtual viewpoint image, it becomes easy to operate the virtual camera to follow the movement of the object. Note that it may be configured such that each of the playback speed of the virtual viewpoint image and the moving speed of the virtual camera can be freely set by the operator, or the moving speed of the virtual camera is automatically determined in accordance with the playback speed of the virtual viewpoint image.

The speed of change of the virtual viewpoint controlled in accordance with the playback speed of the virtual viewpoint image is not limited to the moving speed of the virtual camera (the speed of change of the position), and it may be the speed of change of the orientation or angle of view of the virtual camera. Further, the speed of change of the virtual viewpoint may be determined based on the playback speed of the virtual viewpoint image and the input according to the user operation. For example, if the user greatly tilts the joystick of the controller, the speed of change of the virtual viewpoint may be increased, and if the user slightly tilts the joystick, the speed of change of the virtual viewpoint may be decreased. As the playback speed of the virtual viewpoint image is increased, the sensitivity of change of the virtual viewpoint according to the user operation may be increased. Further, as the playback speed of the virtual viewpoint image is increased, the upper limit of the speed of change of the virtual viewpoint when the joystick is tilted to the maximum may be increased.

Further, the example has been described above in which the playback speed of the virtual viewpoint image is first determined, and the speed of change of the virtual viewpoint is controlled in accordance with the determined playback speed, but the reverse control is also possible. That is, the playback speed of the virtual viewpoint image in the camera path creation mode may be controlled in accordance with the speed of change of the virtual viewpoint in accordance with the user operation. For example, while the user does not move the virtual camera, the virtual viewpoint image may be played back at the normal speed (1× speed), and while the user is moving the virtual viewpoint, the virtual viewpoint image may be played back at a speed (for example, 0.5× speed) lower than the normal speed.

According to the present disclosure, it is facilitated to generate a virtual viewpoint image with a composition desired by the operator of the virtual viewpoint.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The invention claimed is:

1. An information processing apparatus comprising:
   one or more hardware processors; and
   one or more memories storing one or more programs configured to be executed by the one or more hardware processors, the one or more programs including instructions for:
      determining a playback speed of a virtual viewpoint image based on a plurality of captured images;
      accepting an input according to a user operation during playback of the virtual viewpoint image at the determined playback speed; and
      performing control to change a virtual viewpoint corresponding to the virtual viewpoint image based on the accepted input, and performing control such that a speed of change of the virtual viewpoint which is changed in accordance with acceptance of an input according to a specific user operation during playback of the virtual viewpoint image at a first playback speed becomes lower than a speed of change of the virtual viewpoint which is changed in accordance with acceptance of an input according to the specific user operation during playback of the virtual viewpoint image at a second playback speed higher than the first playback speed.

2. The information processing apparatus according to claim 1, wherein the one or more programs further include instructions for:
generating viewpoint information indicating a temporal change of the virtual viewpoint according to the control; and
generating, based on the generated viewpoint information and the plurality of captured images, a virtual viewpoint image to be played back at a playback speed different from the determined playback speed.

3. The information processing apparatus according to claim 1, wherein the one or more programs further include instructions for:
generating viewpoint information indicating a change of the virtual viewpoint according to the control; and
outputting, to an image generation apparatus that generates a virtual viewpoint image based on the plurality of captured images, the generated viewpoint information.

4. The information processing apparatus according to claim 3, wherein the one or more programs further include instructions for:
outputting information indicating a playback speed of the virtual viewpoint image generated by the image generation apparatus.

5. The information processing apparatus according to claim 4, wherein the determined playback speed is different from the playback speed indicated by the output information.

6. The information processing apparatus according to claim 1, wherein the one or more programs further include instructions for:
determining the playback speed of the virtual viewpoint image based on a designation operation by a user.

7. The information processing apparatus according to claim 1, wherein the one or more programs further include instructions for:
determining the playback speed of the virtual viewpoint image based on movement of an object included in at least any of the plurality of captured images.

8. The information processing apparatus according to claim 1, wherein the one or more programs further include instructions for:
determining, based on the determined playback speed, an upper limit of the speed of change of the virtual viewpoint.

9. The information processing apparatus according to claim 1, wherein the one or more programs further include instructions for:
determining, based on the determined playback speed, a sensitivity of change of the virtual viewpoint according to a user operation.

10. The information processing apparatus according to claim 1, wherein the one or more programs further include instructions for:
changing, based on the accepted input, at least any of a position, an orientation, and an angle of view of the virtual viewpoint.

11. The information processing apparatus according to claim 1, wherein the one or more programs further include instructions for:
determining the playback speed of the virtual viewpoint in a camera path creation mode in which a camera path indicating a movement locus of the virtual viewpoint is created during playback of a virtual viewpoint image.

12. An information processing method comprising:
determining a playback speed of a virtual viewpoint image based on a plurality of captured images;
accepting an input according to a user operation during playback of the virtual viewpoint image at the playback speed determined by the determination step; and
performing control to change a virtual viewpoint corresponding to the virtual viewpoint image based on the input accepted in the accepting, and performing control such that a speed of change of the virtual viewpoint which is changed in accordance with acceptance of an input according to a specific user operation during playback of the virtual viewpoint image at a first playback speed becomes lower than a speed of change of the virtual viewpoint which is changed in accordance with acceptance of an input according to the specific user operation during playback of the virtual viewpoint image at a second playback speed higher than the first playback speed.

13. The information processing method according to claim 12, comprising:
generating viewpoint information indicating a temporal change of the virtual viewpoint according to the control in the performing; and
generating, based on the viewpoint information generated in the generating viewpoint information and the plurality of captured images, a virtual viewpoint image to be played back at a playback speed different from the playback speed determined in the determining.

14. The information processing method according to claim 12, wherein in the performing, an upper limit of the speed of change of the virtual viewpoint is determined based on the playback speed determined in the determining.

15. The information processing method according to claim 12, wherein in the performing, a sensitivity of change of the virtual viewpoint according to a user operation is determined based on the playback speed determined in the determining.

16. A non-transitory computer-readable storage medium storing a computer program for causing a computer to function as an information processing apparatus comprising:
one or more hardware processors; and
one or more memories storing one or more programs configured to be executed by the one or more hardware processors, the one or more programs including instructions for:
determining a playback speed of a virtual viewpoint image based on a plurality of captured images;
accepting an input according to a user operation during playback of the virtual viewpoint image at the determined playback speed; and
performing control to change a virtual viewpoint corresponding to the virtual viewpoint image based on the accepted input, and performing control such that a speed of change of the virtual viewpoint which is changed in accordance with acceptance of an input according to a specific user operation during playback of the virtual viewpoint image at a first playback speed becomes lower than a speed of change of the virtual viewpoint which is changed in accordance with acceptance of an input according to the specific user operation during playback of the virtual viewpoint image at a second playback speed higher than the first playback speed.

* * * * *